United States Patent
Sun et al.

(10) Patent No.: US 10,138,353 B2
(45) Date of Patent: Nov. 27, 2018

(54) CROSSLINKABLE POLYMERIC COMPOSITIONS WITH N,N,N',N',N'',N''-HEXAALLYL-1,3,5-TRIAZINE-2,4,6-TRIAMINE CROSSLINKING COAGENT, METHODS FOR MAKING THE SAME, AND ARTICLES MADE THEREFROM

(71) Applicant: Dow Global Technologies LLC, Midland, MI (US)

(72) Inventors: Yabin Sun, Shanghai (CN); Yu Cai, Shanghai (CN); Hong Liang Zhang, Shanghai (CN); Jeffrey M. Cogen, Flemington, NJ (US); Saurav S. Sengupta, Midland, MI (US); Timothy J. Person, Pottstown, PA (US)

(73) Assignee: Dow Global Technologies LLC, Midland, MI (US)

( * ) Notice: Subject to any disclaimer, the term of this patent is extended or adjusted under 35 U.S.C. 154(b) by 90 days.

(21) Appl. No.: 15/117,298

(22) PCT Filed: Mar. 20, 2015

(86) PCT No.: PCT/CN2015/074715
§ 371 (c)(1),
(2) Date: Aug. 8, 2016

(87) PCT Pub. No.: WO2015/149634
PCT Pub. Date: Oct. 8, 2015

(65) Prior Publication Data
US 2017/0009060 A1    Jan. 12, 2017

(30) Foreign Application Priority Data
Mar. 31, 2014    (WO) ............... PCT/CN2014/074376

(51) Int. Cl.
C08K 5/3492    (2006.01)
C08K 5/14    (2006.01)
H01B 3/44    (2006.01)
C08J 3/20    (2006.01)
C09D 123/06    (2006.01)
C09D 131/04    (2006.01)

(52) U.S. Cl.
CPC ............ C08K 5/3492 (2013.01); C08J 3/203 (2013.01); C08K 5/14 (2013.01); C09D 123/06 (2013.01); C09D 131/04 (2013.01); H01B 3/441 (2013.01); C08J 2323/06 (2013.01); C08J 2331/04 (2013.01)

(58) Field of Classification Search
CPC ... D06M 13/358; H01B 3/441; C09D 123/06; C08K 5/3492
See application file for complete search history.

(56) References Cited

U.S. PATENT DOCUMENTS

| | | |
|---|---|---|
| 6,191,230 B1 | 2/2001 | Keogh et al. |
| 6,255,421 B1 | 7/2001 | Plochocka et al. |
| 6,300,442 B1 | 10/2001 | Plochocka et al. |
| 8,076,264 B2 | 12/2011 | Tsurumi et al. |
| 8,420,567 B1 | 4/2013 | Naumann et al. |
| 2004/0014900 A1 | 1/2004 | Coggio et al. |
| 2007/0208142 A1 | 9/2007 | Adair et al. |
| 2008/0274245 A1 | 11/2008 | Lee et al. |
| 2011/0147041 A1 | 6/2011 | Sengupta et al. |
| 2011/0269911 A1* | 11/2011 | Morita ................ C08F 214/22 525/326.2 |
| 2013/0053520 A1 | 2/2013 | Yamaura et al. |
| 2013/0087498 A1 | 4/2013 | Wostmann et al. |
| 2013/0158155 A1 | 6/2013 | Karas et al. |
| 2013/0197163 A1 | 8/2013 | Apostolo et al. |
| 2015/0203701 A1 | 7/2015 | Sun et al. |

FOREIGN PATENT DOCUMENTS

| | | |
|---|---|---|
| CN | 1749303 A | 3/2006 |
| JP | 54100388 | 8/1979 |
| JP | 2003073363 A | 3/2003 |
| JP | 3621992 | 2/2005 |
| JP | 2008050467 A | 3/2008 |
| JP | 2011038015 A | 2/2011 |
| JP | 2011162634 A | 8/2011 |
| JP | 6219962 | 10/2017 |

OTHER PUBLICATIONS

PCT/CN2015/074715, International Search Report and Written Opinion dated Jun. 23, 2015.
PCT/CN2014/074376, International Search Report and Written Opinion dated Dec. 31, 2014.
PCT/CN2015/074715, International Preliminary Report on Patentability dated Oct. 4, 2016.

* cited by examiner

*Primary Examiner* — Gregory Listvoyb

(57) ABSTRACT

Crosslinkable polymeric compositions comprising a thermoplastic, non-elastomer ethylene-based polymer, an organic peroxide, and a crosslinking coagent comprising N,N,N',N',N'',N''-hexaallyl-1,3,5-triazine-2,4,6-triamine. Such crosslinkable polymeric compositions and their crosslinked forms can be employed as polymeric layers in wire and cable applications, such as insulation in power cables.

10 Claims, No Drawings ated by the polymerization of at least two different monomer types. This generic term includes copolymers (usually employed to refer to polymers prepared from two different monomer types), and polymers prepared from more than two different monomer types (e.g., terpolymers (three different monomer types) and quaterpolymers (four different monomer types)).

CROSSLINKABLE POLYMERIC COMPOSITIONS WITH N,N,N',N',N'',N''-HEXAALLYL-1,3,5-TRIAZINE-2,4,6-TRIAMINE CROSSLINKING COAGENT, METHODS FOR MAKING THE SAME, AND ARTICLES MADE THEREFROM

REFERENCE TO RELATED APPLICATIONS

The present application claims the benefit of International Application No. PCT/CN14/074376, filed on Mar. 31, 2014.

FIELD

Various embodiments of the present invention relate to crosslinkable polymeric compositions containing a crosslinking coagent comprising N,N,N',N',N'',N''-hexaallyl-1,3,5-triazine-2,4,6-triamine, methods of making the same, and articles made therefrom.

INTRODUCTION

Medium, high, and extra-high voltage ("MV," "HV," and "EHV") cables typically contain a crosslinked polymeric material as an insulation layer, such as a crosslinked polyethylene. Such crosslinked polymeric materials can be prepared from a crosslinkable polymeric composition having a peroxide initiator. The radical reactions between peroxide and polyethylene generate undesirable byproducts which must be removed by elevated temperature in a degassing chamber after crosslinking the polyethylene. Although advances have been achieved in the field of crosslinkable polymeric compositions, improvements are still desired.

SUMMARY

One embodiment is a crosslinkable polymeric composition, comprising:
(a) a thermoplastic, non-elastomer ethylene-based polymer;
(b) an organic peroxide; and
(c) a crosslinking coagent comprising N,N,N',N',N'',N''-hexaallyl-1,3,5-triazine-2,4,6-triamine.

DETAILED DESCRIPTION

Various embodiments of the present invention concern crosslinkable polymeric compositions comprising an ethylene-based polymer, an organic peroxide, and acoagent comprising N,N,N',N',N'',N''-hexaallyl-1,3,5-triazine-2,4,6-triamine ("HATATA"). Additional embodiments concern crosslinked polymeric compositions prepared from such crosslinkable polymeric compositions. Further embodiments concern coated conductors and processes for producing coated conductors using the crosslinkable polymeric compositions.
Crosslinkable Polymeric Composition As noted above, one component of the crosslinkable polymeric compositions described herein is an ethylene-based polymer. As used herein, "ethylene-based" polymers are polymers prepared from ethylene monomers as the primary (i.e., greater than 50 weight percent ("wt %")) monomer component, though other co-monomers may also be employed. "Polymer" means a macromolecular compound prepared by reacting (i.e., polymerizing) monomers of the same or different type, and includes homopolymers and interpolymers. "Interpolymer" means a polymer prepared by the polymerization of at least two different monomer types. This generic term includes copolymers (usually employed to refer to polymers prepared from two different monomer types), and polymers prepared from more than two different monomer types (e.g., terpolymers (three different monomer types) and quaterpolymers (four different monomer types)).

The starting ethylene-based polymers suitable for use herein are thermoplastic. As known to those skilled in the art, the term "thermoplastic" denotes a polymer that becomes pliable or moldable above a specific temperature and returns to a solid state upon cooling. Additionally, the ethylene-based polymer is not an elastomer. As known to those skilled in the art, "elastomers" are defined as materials which experience large reversible deformations under relatively low stress. Some examples of commercially available elastomers include natural rubber, ethylene/propylene (EPM) copolymers, ethylene/vinyl acetate copolymers, ethylene/propylene/diene (EPDM) copolymers, styrene/butadiene copolymers, chlorinated polyethylene, and silicone rubber. Such polymers are expressly excluded from use as the ethylene-based polymer herein.

In addition, in various embodiments, the ethylene-based polymer can be non-polar. As used with respect to polymers, the term "non-polar" denotes a polymer containing no polar bonds between carbon atoms and other atoms having a higher electronegativity relative to carbon (such as O, N, F, Cl) or, if such polar bonds are present, a polymer in which there is no net dipole because of the symmetrical arrangement of such polar bonds. In various embodiments, the ethylene-based polymer can contain no polar bonds between carbon atoms and other atoms having higher electronegativity relative to carbon.

In various embodiments, the ethylene-based polymer has no halide-containing monomers incorporated therein. Specifically, in various embodiments, the ethylene-based polymer has no fluoromonomers or chloromonomers incorporated therein. As such, in various embodiments, the ethylene-based polymer is neither a fluoropolymer nor a chloropolymer.

In various embodiments, the ethylene-based polymer can be an ethylene homopolymer. As used herein, "homopolymer" denotes a polymer consisting of repeating units derived from a single monomer type, but does not exclude residual amounts of other components used in preparing the homopolymer, such as chain transfer agents.

In an embodiment, the ethylene-based polymer can be an ethylene/alpha-olefin ("α-olefin") interpolymer having an α-olefin content of at least 1 wt %, at least 5 wt %, at least 10 wt %, at least 15 wt %, at least 20 wt %, or at least 25 wt % based on the entire interpolymer weight. These interpolymers can have an α-olefin content of less than 50 wt %, less than 45 wt %, less than 40 wt %, or less than 35 wt % based on the entire interpolymer weight. When an α-olefin is employed, the α-olefin can be a $C_{3-20}$ (i.e., having 3 to 20 carbon atoms) linear, branched or cyclic α-olefin. Examples of $C_{3-20}$ α-olefins include propene, 1-butene, 4-methyl-1-pentene, 1-hexene, 1-octene, 1-decease, 1-dodecene, 1-tetradecene, 1-hexadecene, and 1-octadecene. The α-olefins can also have a cyclic structure such as cyclohexane or cyclopentane, resulting in an α-olefin such as 3-cyclohexyl-1-propene (allyl cyclohexane) and vinyl cyclohexane. Illustrative ethylene/α-olefin interpolymers include ethylene/propylene, ethylene/1-butene, ethylene/1-hexene, ethylene/1-octene, ethylene/propylene/1-octene, ethylene/propylene/1-butene, and ethylene/1-butene/1-octene.

In various embodiments, the ethylene-based polymer can be used alone or in combination with one or more other types of ethylene-based polymers (e.g., a blend of two or more ethylene-based polymers that differ from one another by monomer composition and content, catalytic method of preparation, etc). If a blend of ethylene-based polymers is employed, the polymers can be blended by any in-reactor or post-reactor process.

In various embodiments, the ethylene-based polymer can be selected from the group consisting of low-density polyethylene ("LDPE"), linear-low-density polyethylene ("LLDPE"), very-low-density polyethylene ("VLDPE"), and combinations of two or more thereof.

In an embodiment, the ethylene-based polymer can be an LDPE. LDPEs are generally highly branched ethylene homopolymers, and can be prepared via high pressure processes (i.e., HP-LDPE). LDPEs suitable for use herein can have a density ranging from 0.91 to 0.94 g/cm³. In various embodiments, the ethylene-based polymer is a high-pressure LDPE having a density of at least 0.915 g/cm³, but less than 0.94 g/cm³, or less than 0.93 g/cm³. Polymer densities provided herein are determined according to ASTM International ("ASTM") method D792. LDPEs suitable for use herein can have a melt index ($I_2$) of less than 20 g/10 min., or ranging from 0.1 to 10 g/10 min., from 0.5 to 5 g/10 min., from 1 to 3 g/10 min., or an $I_2$ of 2 g/10 min. Melt indices provided herein are determined according to ASTM method D1238. Unless otherwise noted, melt indices are determined at 190° C. and 2.16 Kg (i.e., $I_2$). Generally, LDPEs have a broad molecular weight distribution ("MWD") resulting in a relatively high polydispersity index ("PDI;" ratio of weight-average molecular weight to number-average molecular weight).

In an embodiment, the ethylene-based polymer can be an LLDPE. LLDPEs are generally ethylene-based polymers having a heterogeneous distribution of comonomer (e.g., α-olefin monomer), and are characterized by short-chain branching. For example, LLDPEs can be copolymers of ethylene and α-olefin monomers, such as those described above. LLDPEs suitable for use herein can have a density ranging from 0.916 to 0.925 g/cm³. LLDPEs suitable for use herein can have a melt index ($I_2$) ranging from 1 to 20 g/10 min., or from 3 to 8 g/10 min.

In an embodiment, the ethylene-based polymer can be a VLDPE. VLDPEs may also be known in the art as ultra-low-density polyethylenes, or ULDPEs. VLDPEs are generally ethylene-based polymers having a heterogeneous distribution of comonomer (e.g., α-olefin monomer), and are characterized by short-chain branching. For example, VLDPEs can be copolymers of ethylene and α-olefin monomers, such as one or more of those α-olefin monomers described above. VLDPEs suitable for use herein can have a density ranging from 0.87 to 0.915 g/cm³. VLDPEs suitable for use herein can have a melt index ($I_2$) ranging from 0.1 to 20 g/10 min., or from 0.3 to 5 g/10 min.

In an embodiment, the ethylene-based polymer can comprise a combination of any two or more of the above-described ethylene-based polymers.

Production processes used for preparing ethylene-based polymers are wide, varied, and known in the art. Any conventional or hereafter discovered production process for producing ethylene-based polymers having the properties described above may be employed for preparing the ethylene-based polymers described herein. In general, polymerization can be accomplished at conditions known in the art for Ziegler-Natta or Kaminsky-Sinn type polymerization reactions, that is, at temperatures from 0 to 250° C., or 30 or 200° C., and pressures from atmospheric to 10,000 atmospheres (1,013 megaPascal ("MPa")). In most polymerization reactions, the molar ratio of catalyst to polymerizable compounds employed is from $10^{-12}$:1 to $10^{-1}$:1, or from $10^{-9}$:1 to $10^{-5}$:1.

An example of an ethylene-based polymer suitable for use herein is low-density polyethylene produced in a high pressure process and having a density of 0.92 g/cm³ and a melt index ($I_2$) of 2 g/10 min.

As noted above, the above-described ethylene-based polymer is combined with an organic peroxide. As used herein, "organic peroxide" denotes a peroxide having the structure: $R^1$—O—O—$R^2$, or $R^1$—O—O—R—O—O—$R^2$, where each of $R^1$ and $R^2$ is a hydrocarbyl moiety, and R is a hydrocarbylene moiety. As used herein, "hydrocarbyl" denotes a univalent group formed by removing a hydrogen atom from a hydrocarbon (e.g. ethyl, phenyl) optionally having one or more heteroatoms. As used herein, "hydrocarbylene" denotes a bivalent group formed by removing two hydrogen atoms from a hydrocarbon optionally having one or more heteroatoms. The organic peroxide can be any dialkyl, diaryl, dialkaryl, or diaralkyl peroxide, having the same or differing alkyl, aryl, alkaryl, or aralkyl moieties. In an embodiment, each of $R^1$ and $R^2$ is independently a $C_1$ to $C_{20}$ or $C_1$ to $C_{12}$alkyl, aryl, alkaryl, or aralkyl moiety. In an embodiment, R can be a $C_1$ to $C_{20}$ or $C_1$ to $C_{12}$ alkylene, arylene, alkarylene, or aralkylene moiety. In various embodiments, R, $R^1$, and $R^2$ can have the same or a different number of carbon atoms and structure, or any two of R, $R^1$, and $R^2$ can have the same number of carbon atoms while the third has a different number of carbon atoms and structure.

Organic peroxides suitable for use herein include mono-functional peroxides and di-functional peroxides. As used herein, "mono-functional peroxides" denote peroxides having a single pair of covalently bonded oxygen atoms (e.g., having a structure R—O—O—R). As used herein, "di-functional peroxides" denote peroxides having two pairs of covalently bonded oxygen atoms (e.g., having a structure R—O—O—R—O—O—R). In an embodiment, the organic peroxide is a mono-functional peroxide.

Exemplary organic peroxides include dicumyl peroxide ("DCP"); tert-butyl peroxybenzoate; di-tert-amyl peroxide ("DTAP"); bis(alpha-t-butyl-peroxyisopropyl) benzene ("BIPB"); isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3; 1,1-bis(t-butylperoxy)-3,3,5-trimethylcyclohexane; isopropylcumyl cumylperoxide; butyl 4,4-di(tert-butylperoxy)valerate; di(isopropylcumyl) peroxide; and mixtures of two or more thereof. In various embodiments, only a single type of organic peroxide is employed. In an embodiment, the organic peroxide is dicumyl peroxide.

As noted above, the crosslinkable polymeric composition further comprises a crosslinking coagent. The crosslinking coagent comprises N,N,N',N',N'',N''-hexaallyl-1,3,5-triazine-2,4,6-triamine ("HATATA"). HATATA has the following structure:

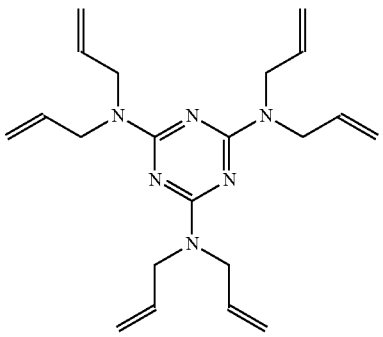 [SMILES: C=CCN(CC=C)c1nc(N(CC=C)CC=C)nc(N(CC=C)CC=C)n1]

In various embodiments, the crosslinkable polymeric composition can include one or more additional crosslinking coagents. Examples of such crosslinking coagents include polyallyl crosslinking coagents, such as triallyl isocyanurate ("TAIC"), triallyl cyanurate ("TAC"), triallyl trimellitate ("TATM"), triallyl orthoformate, pentaerythritol triallyl ether, triallyl citrate, and triallyl aconitate; ethoxylated bisphenol A dimethacrylate; α-methyl styrene dimer ("AMSD"); acrylate-based coagents, such as trimethylolpropane triacrylate ("TMPTA"), trimethylolpropane trimethylacrylate ("TMPTMA"), 1,6-hexanediol diacrylate, pentaerythritol tetraacrylate, dipentaerythritol pentaacrylate, tris(2-hydroxyethyl) isocyanurate triacrylate, and propoxylated glyceryl triacrylate; vinyl-based coagents, such as polybutadiene having a high 1,2-vinyl content, and trivinyl cyclohexane ("TVCH"); and other coagents as described in U.S. Pat. Nos. 5,346,961 and 4,018,852.

In various embodiments, the crosslinkable polymeric composition can comprise the ethylene-based polymer in an amount ranging from 50 to 99 wt %, from 80 to 99 wt %, from 90 to 99 wt %, or from 95 to 99 wt %, based on the entire crosslinkable polymeric composition weight. Additionally, the crosslinkable polymeric composition can comprise the organic peroxide in an amount ranging from 0.1 to 5 wt %, from 0.1 to 3 wt %, from 0.4 to 2 wt %, from 0.4 to 1.7 wt %, from 0.5 to 1.4 wt %, or from 0.7 to less than 1.0 wt %, based on the entire crosslinkable polymeric composition weight. In various embodiments, the organic peroxide can be present in an amount of less than 1.2 wt %, less than 1.0 wt %, or in the range of from 0.2 to 0.85 wt %, 0.3 to 0.7%, 0.4 to 0.6% based on the entire crosslinkable polymeric composition weight. In still further embodiments, the organic peroxide can be present in an amount of less than 1.2 parts per hundred resin ("phr"), less than 1.0 phr, less than 0.85 phr, or in the range of from 0.2 to 0.85 phr, 0.3 to 0.7 phr, 0.4 to 0.6 phr based on 100 weight parts of the ethylene-based polymer. Furthermore, the crosslinkable polymeric composition can comprise the HATATA crosslinking coagent in an amount ranging from 0.01 to 15 wt %, from 0.05 to 5 wt %, from 0.1 to 3 wt %, from 0.5 to 3 wt %, from 0.7 to 3 wt %, from 1.0 to 3 wt %, from 1.5 to 3 wt %, from 0.2 to 1 wt %, from 0.3 to 0.9 wt %, from 0.4 to 0.8 wt %, or from 0.4 to 0.7 wt % based on the entire crosslinkable polymeric composition weight.

In various embodiments, the HATATA can constitute at least 1 wt %, at least 10 wt %, at least 20 wt %, at least 30 wt %, at least 40 wt %, at least 50 wt %, at least 60 wt %, at least 70 wt %, at least 80 wt %, at least 90 wt %, or at least 99 wt % of the total amount of crosslinking coagent, based on the total weight of the crosslinking coagent present in the crosslinkable polymeric composition. In further embodiments, the HATATA can constitute all or substantially all of the crosslinking coagent, based on the total weight of the crosslinking coagent present in the crosslinkable polymeric composition. As used herein, "substantially all" with respect to the HATATA crosslinking coagent means all other crosslinking coagents are present in an aggregate amount of 10 parts per million by weight ("ppmw") or less. In further embodiments, the organic peroxide and HATATA crosslinking coagent can be present in a coagent-to-peroxide weight ratio of at least 1:1, or greater than 1:1.

In various embodiments, the crosslinking coagent and organic peroxide can be present in amounts sufficient to achieve a molar ratio of allyl groups to active oxygen atoms of at least 1.6, at least 1.9, at least 2.5, or at least 3.0, and up to 5, up to 7.5, up to 10, up to 12, or up to 16 allyl groups/active oxygen atoms. In determining this ratio, only oxygen atoms present as one of two covalently bonded oxygen atoms in the organic peroxide are considered "active oxygen atoms." For example, a mono-functional peroxide has two active oxygen atoms. Oxygen atoms present in the organic peroxide or the polyallyl crosslinking coagent that are not covalently bonded to another oxygen atom are not considered active oxygen atoms. Additionally, only pendant allyl groups found on the polyallyl cross-linking coagent are included in the molar ratio of allyl groups/active oxygen atoms. The allyl-to-active oxygen molar ratio is calculated as follows:

$$\frac{\frac{\text{(moles polyallyl coagent)}}{\text{(number of allyl groups per coagent molecule)}}}{\frac{\text{(moles peroxide)}}{\text{(number of active oxygen atoms per peroxide molecule)}}}$$

In addition to the components described above, the crosslinkable polymeric composition may also contain one or more additives including, but not limited to, antioxidants, processing aids, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, flame retardants, and metal deactivators. Additives, other than fillers, are typically used in amounts ranging from 0.01 or less to 10 or more wt % based on total composition weight. Fillers are generally added in larger amounts, although the amount can range from as low as 0.01 or less to 65 or more wt % based on the total composition weight. Illustrative examples of fillers include clays, precipitated silica and silicates, fumed silica, calcium carbonate, ground minerals, aluminum trihydroxide, magnesium hydroxide, and carbon blacks with typical arithmetic mean particle sizes larger than 15 nanometers.

In various embodiments, the crosslinkable polymeric composition can comprise one or more antioxidants. Exemplary antioxidants include hindered phenols (e.g., tetrakis [methylene (3,5-di-t-butyl-4-hydroxyhydrocinnamate)] methane), less-hindered phenols, and semi-hindered phenols; phosphates, phosphites, and phosphorites (e.g., tris (2,4-di-t-butylphenyl) phosphate); thio compounds (e.g., distearyl thiodipropionate, dilaurylthiodipropionate); various siloxanes; and various amines (e.g., polymerized 2,2,4-trimethyl-1,2-dihydroquinoline). In various embodiments, the antioxidant is selected from the group consisting of distearyl thiodipropionate, dilauryl thiodipropionate, octadecyl-3,5-di-t-butyl-4-hydroxyhydrocinnamate, benzenepropanoic acid, 3,5-bis (1,1-dimethylethyl)-4-hydroxythiodi-2,1-ethanediyl ester, stearyl 3-(3,5-di-t-butyl-4-hydroxyphenyl)propionate, octadecyl-3-(3,5-di-tert-butyl-4-hydroxyphenyl)-propionate, 2,4-bis(dodecylthiomethyl)-6-methylphenol, 4,4'-thiobis(6-tert-butyl-m-cresol), 4,6-bis (octylthiomethyl)-o-cresol, 1,3,5-tris(4-tert-butyl-3-hydroxy-2,6-dimethylbenzyl)-1,3,5-triazine-2,4,6-(1H,3H, 5H)-trione, pentaerythritoltetrakis (3-(3,5-di-t-butyl-4-hydroxyphenyl)propionate), 2',3-bis[[3-[3,5-di-tert-butyl-4-hydroxyphenyl] propionyl]]propionohydrazide, and mixtures of two or more thereof. Antioxidants, when present, can be used in amounts ranging from 0.01 to 5 wt %, from 0.01 to 1 wt %, from 0.1 to 5 wt %, from 0.1 to 1 wt %, or from 0.1 to 0.5 wt %, based on the total weight of the crosslinkable polymeric composition.

Preparation of Crosslinkable Polymeric Composition

Preparation of the cross-linkable polymeric composition can comprise compounding the above-described components. For example, compounding can be performed by either (1) compounding all components into the ethylene-based polymer, or (2) compounding all the components except for the organic peroxide and crosslinking coagent, which can be soaked in as described below. Compounding of the cross-linkable polymeric composition can be effected by standard equipment known to those skilled in the art. Examples of compounding equipment are internal batch mixers, such as a Brabender™, Banbury™, or Bolling™ mixer. Alternatively, continuous single or twin screw, mixers can be used, such as a Farrel™ continuous mixer, a Werner and Pfleiderer™ twin screw mixer, or a Buss™ kneading continuous extruder. Compounding can be performed at a temperature of greater than the melting temperature of the ethylene-based polymer up to a temperature above which the ethylene-based polymer begins to degrade. In various embodiments, compounding can be performed at a temperature ranging from 100 to 200° C., or from 110 to 150° C.

In one or more embodiments, the ethylene-based polymer and any optional components can first be melt compounded according to the above-described procedure and pelletized. Next, the organic peroxide and the cross-linking coagent can be soaked into the resulting ethylene-based polymer compound, either simultaneously or sequentially. In an embodiment, the organic peroxide and coagent can be premixed at the temperature above the melting temperature of the organic peroxide and coagent, whichever is greater, followed by soaking the ethylene-based polymer compound in the resulting mixture of the organic peroxide and cross-linking coagent at a temperature ranging from 30 to 100° C., from 50 to 90° C., or from 60 to 80° C., for a period of time ranging from 1 to 168 hours, from 1 to 24 hours, or from 3 to 12 hours.

The resulting crosslinkable polymeric composition can have certain enhanced properties. Though not wishing to be bound by theory, it is believed that use of an HATATA crosslinking coagent can surprisingly provide superior resistance to coagent migration out of the crosslinkable polymeric composition. Thus, in various embodiments, the crosslinkable polymeric composition can exhibit a crosslinking coagent migration to the surface of the crosslinkable polymeric composition of less than 1,000 parts per million ("ppm"), less than 750 ppm, less than 500 ppm, or less than 350 ppm, based on the total weight of the crosslinkable polymeric composition, when stored at 23° C. and 1 atm over a period of four weeks. Furthermore, the crosslinkable polymeric composition can exhibit a crosslinking coagent migration to the surface of the crosslinkable polymeric composition in the range of from 1 to 1,000 ppm, from 10 to 750 ppm, from 50 to 500 ppm, or from 200 to 400 ppm, based on the total weight of the crosslinkable polymeric composition, when stored at 23° C. and 1 atm over a period of four weeks. The method for determining coagent migration is detailed in the Test Methods section, below, at a coagent loading of 2.50 wt % based on the entire weight of the crosslinkable polymeric composition.

Crosslinked Polymeric Composition

The above-described crosslinkable polymeric composition can be cured or allowed to cure in order to form a crosslinked ethylene-based polymer. Such curing can be performed by subjecting the crosslinkable polymeric composition to elevated temperatures in a heated cure zone, which can be maintained at a temperature in the range of 175 to 260° C. The heated cure zone can be heated by pressurized steam or inductively heated by pressurized nitrogen gas. Thereafter, the crosslinked polymeric composition can be cooled (e.g., to ambient temperature).

The crosslinking process can create volatile decomposition byproducts in the crosslinked polymeric composition. Following crosslinking, the crosslinked polymeric composition can undergo degassing to remove at least a portion of the volatile decomposition byproducts. Degassing can be performed at a degassing temperature, a degassing pressure, and for a degassing time period to produce a degassed polymeric composition. In various embodiments, the degassing temperature can range from 50 to 150° C., or from 60 to 80° C. In an embodiment, the degassing temperature is 65 to 75° C. Degassing can be conducted under standard atmosphere pressure (i.e., 101,325 Pa).

Coated Conductor

A cable comprising a conductor and an insulation layer can be prepared employing the above-described crosslinkable polymeric composition. "Cable" and "power cable" mean at least one wire or optical fiber within a sheath, e.g., an insulation covering and/or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. Typical cable designs are illustrated in U.S. Pat. Nos. 5,246,783, 6,496,629 and 6,714,707. "Conductor" denotes one or more wire(s) or fiber(s) for conducting heat, light, and/or electricity. The conductor may be a single-wire/fiber or a multi-wire/fiber and may be in strand form or in tubular form. Non-limiting examples of suitable conductors include metals such as silver, gold, copper, carbon, and aluminum. The conductor may also be optical fiber made from either glass or plastic.

Such a cable can be prepared with various types of extruders (e.g., single or twin screw types) by extruding the crosslinkable polymeric composition onto the conductor, either directly or onto an interceding layer. A description of a conventional extruder can be found in U.S. Pat. No. 4,857,600. An example of co-extrusion and an extruder therefore can be found in U.S. Pat. No. 5,575,965.

Following extrusion, the extruded cable can pass into a heated cure zone downstream of the extrusion die to aid in crosslinking the crosslinkable polymeric composition and thereby produce a crosslinked polymeric composition. The heated cure zone can be maintained at a temperature in the range of 175 to 260° C. In an embodiment, the heated cure zone is a continuous vulcanization ("CV") tube. In various embodiments, the crosslinked polymeric composition can then be cooled and degassed, as discussed above.

Alternating current cables can be prepared according to the present disclosure, which can be low voltage, medium voltage, high voltage, or extra-high voltage cables. Further, direct current cables can be prepared according to the present disclosure, which can include high or extra-high voltage cables.

Test Methods

Density

Determine density according to ASTM D792.

Melt Index

Measure melt index, or $I_2$, in accordance with ASTM D1238, condition 190° C./2.16 kg, and report in grams eluted per 10 minutes.

Moving Die Rheometer ("MDR")

Curing behavior is recorded by MDR at 180° C. according to ASTM D5289. Similar tests are conducted at a temperature of 140° C. and 150° C. in order to characterize a scorch time (the time required for the sample to achieve a unit increase in torque). Unless otherwise noted, MH and ML are reported as measured at 180° C.

Nuclear Magnetic Resonance ("NMR")

NMR data were collected from a Bruker Ultrashield 400 plus NMR spectrometer. The peak of deuterated chloroform was used as reference, with its chemical shift set to be 7.27 ppm. Mass Spectroscopy ("MS")

Liquid Chromatography/Mass Spectrometry

LC-MS data were recorded on Agilent 1220 HPLC/G6224A TOF mass spectrometer.

Migration

The pellets samples were sealed in a bottle and aged at certain temperature, 23° C. and 60° C. After aging is complete, weigh 3.000±0.001 g pellet sample and place into a 40-mL vial. Add 14.5 mL of acetonitrile into the vial, seal the vial, and shake in a shaker for 5 minutes. Collect the liquid in the 40-mL vial and place into a 2-mL sample vial for high-pressure liquid chromatography ("HPLC") analysis. Analyze the samples by HPLC according to the following conditions:

| LC Parameter | Details |
| --- | --- |
| Column | Agilent Extend-C18, 5 μm particle, 4.6 mm × 150 mm |
| Column Oven | 40° C. |
| Flow rate | 1.000 mL/min. |
| Injection volume | 10 μL |
| Detector | UV absorbance at 210 nm |
| Mobile Phase A | Water |
| Mobile Phase B | Acetonitrile |

| Time (min.) | B % | Flow Rate (mL/min.) |
| --- | --- | --- |
| 0.00 | 60 | 1.000 |
| 8.00 | 80 | 1.000 |
| 10.00 | 95 | 1.000 |
| 12.00 | 100 | 1.000 |
| 25.00 | 100 | 1.000 |
| 25.10 | 60 | 1.000 |

The co-agent content in acetonitrile ("ACN") solution is calculated from pre-established calibration curve. A calibration curve is established by plotting UV absorbance response from the HPLC detector against acetonitrile solutions of a certain co-agent at five different concentrations ranging from 2 ppm to 500 ppm, using the conditions in the above table. Then the concentration of a sample co-agent solution can be determined from this pre-established curve. With the known content of co-agent in a sample solution, the migration level from the sample can be back-calculated. The numerical value is given in ppm of total weight of the sample.

Curing

Cured plaques are prepared with 1-mm thickness by the following steps:
1. Preheat the sample at 130° C. for 5 min.;
2. Release the air trapped in the sample by the operation of plate open/close for 8 times;
3. Allow another 5 minutes to increase the plate temperature to 182° C.;
4. Complete the curing under a pressure of 100 kN for 15 minutes;
5. Allow another 5 minutes to decrease the plate temperature to 45° C.

Mechanical Properties

Conduct tensile test at a speed of 500 mm/min on Instron5565 according to ASTM D638;

Heat Aging

Age the samples in a UL oven at 150° C. for 10 and 14 days. Then measure the mechanical property after 24 hours of conditioning at room temperature.

Dissipation Factor

Prepare cured plaques with a thickness of about 0.35 mm according to the curing steps outlined above. Degas the plaques in a vacuum oven for 3 days. Measure the dissipation factor at 60° C. and 1 KV by Soken Automated Schering Bridge, DAC-PSC-UA.

Materials

The following materials are employed in the Examples, below.

A first low-density polyethylene ("LDPE") is employed that has a melt index ($I_2$) of 2 g/10 min. and a density of 0.920 g/cm$^3$. The LDPE ("LDPE 1") is produced by The Dow Chemical Company, Midland, Mich.

A second LDPE ("LDPE 2") employed has a melt index ($I_2$) of 2 g/10 min. and a density of 0.920 g/cm$^3$. The LDPE is produced by The Dow Chemical Company, Midland Mich., USA. LDPE 2 contains 0.14 wt % Cyanox 1790 (from Cytec Industries), 0.23 wt % distearyl thiodipropionate ("DSTDP") (from Reagens) and 0.008 wt % Cyasorb UV 3346 (from Cytec Industries).

Dicumyl peroxide is commercially available from Shanghai Fangruida Chemicals Co., Ltd.

The ethylene vinyl acetate ("EVA") employed is ELVAX™ 265, which has a vinyl acetate content of 28 weight percent, a density of 0.951 g/cm$^3$, and a melt index ($I_2$) of 3 g/10 min. ELVAX™ 265 is commercially available from E. I. du Pont de Nemours and Company, Wilmington, Del., USA.

Stabilizer Preblend is a melt blend of 37:61:2 wt % mixture of Cyanox 1790 (from Cytec Industries), DSTDP (from Reagens) and Cyasorb UV 3346 (from Cytec Industries).

Triallyl isocyanurate ("TAIC") is commercially available from Shanghai Fangruida Chemicals Co., Ltd.

Cyanuric chloride is commercially available from Sinopharm Chemical.

Sodium carbonate is commercially available from Sinopharm Chemical.

1,4-Dioxane is commercially available from Sinopharm Chemical.

Diallylamine is commercially available from Sinopharm Chemical.

Sodium hydroxide is commercially available from Sinopharm Chemical.

EXAMPLES

Coagent Preparation Procedure

Prepare N,N,N',N',N",N"-hexaallyl-1,3,5-triazine-2,4,6-triamine ("HATATA") by adding 3.69 g (0.02 mol) cyanuric acid and 8.90 g (0.064 mol) sodium carbonate into 30 g of 1,4-dioxane in a three-neck flask. While stirring, heat the mixture to 75° C., and stir for an additional 5 minutes upon reaching 75° C. Next, gradually add 10.22 g (0.1 mol) diallylamine dropwise over about 15 minutes, then add 2.8 g of sodium hydroxide (0.07 mol) and raise the temperature to about 90° C. Keep the reaction mixture at 90° C. for 5 hours. Thereafter, cool the reaction mixture to room temperature and filter using vacuum filtration with a sand-core funnel to remove insoluble salts. The resulting filtrate is distilled under reduced pressure to recover the solvent, and the residue is dissolved in petroleum ether and further purified through silica gel column. This is performed by first transferring the liquid filtrate from the flask to the silica gel column and use 2 mL of petroleum ether to wash the flask and transfer the solution to the silica gel. The silica gel is 300 mesh and is used as the stationary phase; the petroleum ether is used as the eluent. $^1$H NMR (400 MHz, CDCl$_3$) δ5.84 (m, 3H), 5.11 (m, 6H), 4.13 (d, 6H). ESI-MS (m/z, MH$^+$) Calculated: 367.26 Da; Found: 367.26 Da.

Sample Compounding

Compounding Procedure 1

Sample S1 and Comparative Samples CS1 and CS2 are prepared according to Compounding Procedure 1. Polyethylene pellets are fed into a Brabender mixer at 125° C. with a rotor speed of 30 rpm to melt the polyethylene. Next, antioxidant, DCP, and the coagents (if present) are added into the mixer respectively. The blend is mixed for 3 minutes. The compound is then pelletized through a single-screw extruder.

Compounding Procedure 2

Comparative Samples CS3-CS8 and S2-S3 are prepared according Compounding Procedure 2. Premix the DCP and coagent at 60° C. for about 20 minutes to form a substantially homogeneous liquid mixture. Inject the DCP/coagent liquid mixture onto the EVA or polyethylene pellets and soak at 70° C. for 8 hours.

Compounding Procedure 3

Samples S4-S7 are prepared according Compounding Procedure 3. Polyethylene pellets, LDPE 1 and LDPE 2 with a certain ratio to achieve certain antioxidant level, are fed into a Brabender single screw extruder at 125° C. for mixing and pelletizing the polyethylene intermediate. Premix the DCP and coagent at 60° C. for about 20 minutes to form a substantially homogeneous liquid mixture. Inject the DCP/coagent liquid mixture onto the polyethylene intermediate pellets and soak at 70° C. for 8 hours.

Example 1—Comparison of HATATA to TAIC in Polyethylene

Prepare a Sample (S1) and two Comparative Samples (CS1 and CS2) according to the formulations provided in Table 1, below, and using Compounding Procedure 1, described above.

TABLE 1

Compositions of S1, CS1, and CS2

| Component | CS1 | CS2 | S1 |
|---|---|---|---|
| LDPE 1 (g) | 97.94 | 97.66 | 96.76 |
| TAIC (g) | — | 1.60 | — |
| HATATA (g) | — | — | 2.50 |
| DCP (g) | 1.70 | 0.50 | 0.50 |
| Stabilizer Preblend (g) | 0.36 | 0.24 | 0.24 |
| Total: | 100.00 | 100.00 | 100.00 |
| Allyl-to-Active Oxygen ratio (molar) | — | 5.2 | 11.1 |
| Coagent-to-DCP ratio (weight) | — | 3.2 | 5 |

Analyze S1, CS1, and CS2 for curing behavior and coagent migration using the above-described Test Methods. The results are provided in Table 2, below.

TABLE 2

Properties of S1, CS1, and CS2

| Property | CS1 | CS2 | S1 |
|---|---|---|---|
| ML (dN · m) | 0.22 | 0.17 | 0.16 |
| MH (dN · m) | 4.06 | 3.87 | 3.85 |
| MH – ML (dN · m) | 3.84 | 3.70 | 3.69 |
| ts1@180° C. (min.) | 1.16 | 1.32 | 1.57 |
| T90@180° C. (min.) | 4.41 | 4.91 | 5.31 |
| ts1@140° C. (min.) | 36.71 | 55.68 | 84.50 |
| ts0.5@140° C. (min.) | 20.92 | 35.65 | 51.54 |
| Migration after storage at 23° C. for 4 weeks (ppm) | N/A | 3010 | 306 |
| Migration after storage at 60° C. for 4 weeks (ppm) | N/A | 1831 | 335 |
| Dissipation factor (%) 1 kV(2.9 kv/mm), 60° C. | — | — | 0.022 |

The results from Table 2 show that both TAIC (CS2) and HATATA (S1) achieve comparable curing potential and improved scorch performance. However, of the two, HATATA provides superior scorch performance, as evidenced by the increase of ts1@140° C. from about 55 minutes to about 84 minutes. Additionally, HATATA surprisingly provides much greater coagent migration resistance than TAIC.

Example 2 (Comparative)—Effect of HATATA in EVA Matrix

Prepare four Comparative Samples (CS3-CS6) according to the formulations provided in Table 3, below, and using Compounding Procedure 2, described above.

TABLE 3

Compositions of CS3-CS6

| Component | CS3 | CS4 | CS5 | CS6 |
|---|---|---|---|---|
| EVA (g) | 98.30 | 98.10 | 98.55 | 97.15 |
| TAIC (g) | 0.40 | — | 0.95 | — |
| HATATA (g) | — | 0.60 | — | 2.35 |
| DCP (g) | 1.30 | 1.30 | 0.50 | 0.50 |
| Total: | 100.00 | 100.00 | 100.00 | 100.00 |
| Allyl-to-Active Oxygen ratio (molar) | 0.5 | 1.0 | 3.1 | 10.4 |
| Coagent-to-DCP ratio (weight) | 0.3 | 0.5 | 1.9 | 4.7 |

Analyze CS3-CS6 for curing behavior using the above-described Test Methods. The results are provided in Table 4, below.

TABLE 4

Curing Properties of CS3-CS6

| Property | CS3 | CS4 | CS5 | CS6 |
|---|---|---|---|---|
| Condition: 180° C., 20 min. | | | | |
| ML (dN · m) | 0.24 | 0.22 | 0.19 | 0.17 |
| MH (dN · m) | 7.92 | 7.26 | 7.78 | 7.87 |
| T10 (min.) | 0.42 | 0.41 | 0.52 | 0.67 |
| T30 (min.) | 0.55 | 0.53 | 0.72 | 0.91 |
| T50 (min.) | 0.70 | 0.67 | 0.93 | 1.14 |
| T90 (min.) | 2.30 | 2.14 | 2.25 | 2.35 |
| Condition: 150° C., 15 min. | | | | |
| ML (dN · m) | 0.26 | 0.25 | 0.25 | 0.24 |
| MH (dN · m) | 5.76 | 5.62 | 5.63 | 4.78 |

TABLE 4-continued

Curing Properties of CS3-CS6

| Property | CS3 | CS4 | CS5 | CS6 |
|---|---|---|---|---|
| ts0.5 (min.) | 1.96 | 1.70 | 3.18 | 4.65 |
| ts1 (min.) | 2.73 | 2.29 | 4.432 | 6.52 |
| T50 (min.) | 5.06 | 4.11 | 7.79 | 9.73 |
| T90 (min.) | 10.89 | 9.76 | 12.96 | 13.83 |
| Condition: 140° C., 45 min. | | | | |
| ML (dN · m) | 0.31 | 0.31 | 0.31 | 0.29 |
| MH (dN · m) | 6.07 | 6.15 | 5.37 | 4.97 |
| ts0.5 (min.) | 4.84 | 3.58 | 9.343 | 13.31 |
| ts1 (min.) | 7.14 | 5.15 | 13.67 | 18.37 |
| T50 (min.) | 14.46 | 10.70 | 24.25 | 28.42 |
| T90 (min.) | 31.78 | 29.07 | 39.70 | 41.28 |

Looking at the results in Table 4, at higher DCP loading (CS3 and CS4) the HATATA accelerates the curing speed to achieve comparable MH (i.e., the maximum torque value recorded on a vulcanization curve after crosslinking). Additionally, HATATA accelerates curing speed even more at 150° C. compared to TAIC. In fact, at all three different temperatures (140° C., 150° C., and 180° C.), HATATA accelerates curing speed compared to TAIC.

Surprisingly, however, at lower DCP loading (CS5 and CS6) TAIC accelerates the premature curing speed at processing temperatures (i.e., 140 and 150° C.) more than HATATA. This indicates inferior scorch resistance by TAIC at lower processing temperatures.

Example 3—Curing Efficiency and Scorch Performance of HATATA in LDPE

Prepare two Samples (S2 and S3) and two Comparative Samples (CS7 and CS8) according to the formulations provided in Table 5, below, and using Compounding Procedure 2, described above.

TABLE 5

Compositions of CS7, CS8, S2, and S3

| Component | CS7 | S2 | CS8 | S3 |
|---|---|---|---|---|
| LDPE2 (g) | 98.30 | 98.10 | 98.55 | 97.15 |
| TAIC (g) | 0.40 | — | 0.95 | — |
| HATATA (g) | — | 0.60 | — | 2.35 |
| DCP (g) | 1.30 | 1.30 | 0.50 | 0.50 |
| Total: | 100.00 | 100.00 | 100.00 | 100.00 |
| Allyl-to-Active Oxygen ratio (molar) | 0.5 | 1.0 | 3.1 | 10.4 |
| Coagent-to-DCP ratio (weight) | 0.3 | 0.5 | 1.9 | 4.7 |

Analyze CS7, CS8, S2, and S3 for curing behavior and scorch improvement using the above-described Test Methods. The results are provided in Table 6, below.

TABLE 6

Properties of CS7, CS8, S2, and S3

| Property | CS7 | S2 | CS8 | S3 |
|---|---|---|---|---|
| ML (dN · m) | 0.19 | 0.20 | 0.18 | 0.17 |
| MH (dN · m) | 3.88 | 3.89 | 2.02 | 2.13 |
| T90@180° C. (min.) | 4.20 | 3.90 | 5.69 | 5.93 |
| ts0.5@140° C. (min.) | 27.1 | 29.9 | >45 | >45 |
| ts1@140° C. (min.) | 41.4 | 45.0 | >45 | >45 |

As shown in Table 6, at higher DCP loading, the curing speed of the HATATA-containing sample (S2) is faster than the sample containing TAIC (CS7). Surprisingly, the scorch times at 140° C. for S2 are longer than for CS7, which is the opposite of what one would expect based on the high-DCP-loading EVA samples (CS3 and CS4, above). At lower DCP loadings, HATATA provides comparable curing potential as TAIC (compare CS8 and S3).

Example 4—Performance of HATATA at Various Loading Levels

Prepare four additional Samples (S4 to S7) according to the formulations provided in Table 7, below, and using Compounding Procedure 3, described above.

TABLE 7

Compositions of S4 to S7

| Component | S4 | S5 | S6 | S7 |
|---|---|---|---|---|
| LDPE 1 (g) | 44.35 | 33.51 | 58.05 | 57.93 |
| LDPE 2 (g) | 53.75 | 64.34 | 40.5 | 40.42 |
| TAIC (g) | 0.40 | 0.45 | 0.45 | 0.45 |
| HATATA (g) | 1.00 | 1.00 | 0.50 | 0.80 |
| DCP (g) | 0.50 | 0.70 | 0.50 | 0.40 |
| Total: | 100.00 | 100.00 | 100.00 | 100.00 |
| Allyl-to-Active Oxygen ratio (molar) | 5.7 | 4.2 | 3.7 | 6.2 |
| Coagent-to-DCP ratio (weight) | 2.8 | 2.1 | 1.9 | 3.1 |

Analyze S4-S7 for curing behavior and mechanical properties using the above-described Test Methods. The results are provided in Table 8, below.

TABLE 8

Properties of S4 to S7

| Property | S4 | S5 | S6 | S7 |
|---|---|---|---|---|
| ML (dN · m) | 0.19 | 0.19 | 0.19 | 0.18 |
| MH (dN · m) | 3.23 | 4.25 | 3.32 | 3.01 |
| MH – ML (dN · m) | 3.04 | 4.06 | 3.13 | 2.83 |
| ts1@180° C. (min.) | 1.52 | 1.11 | 1.25 | 1.58 |
| T90@180° C. (min.) | 4.96 | 4.14 | 4.16 | 4.86 |
| ts1@140° C. (min.) | 76.39 | 53.25 | 53.09 | 72.11 |
| ts0.5@140° C. (min.) | 46.45 | 33.96 | 34.25 | 45.00 |
| Migration after storage, at 23° C. for 4 weeks (ppm), | 190/221* | 351/366* | 214/74* | N/A |
| TE, %, initial | 477.4 | 470.7 | 503.1 | 528.4 |
| std | 22.7 | 18.2 | 31.3 | 15.9 |
| TS, MPa, initial | 19.6 | 21.2 | 19.1 | 20.4 |
| std | 2 | 2.14 | 1.8 | 0.9 |
| TE, %, aged at 150° C. for 10 days | 486.6 | 480.7 | 542.3 | 538.3 |
| std | 30.1 | 15.4 | 40.4 | 10.8 |
| TS, MPa, aged at 150° C. for 10 days | 19.6 | 21.2 | 21.3 | 21.5 |
| std | 1.8 | 0.4 | 2.3 | 1.0 |
| TE Retention, aged at 150° C. for 10 days | 101.9% | 102.1% | 107.8% | 101.9% |
| TS Retention, aged at 150° C. for 10 days | 100.0% | 100.1% | 111.7% | 105.5% |
| TE, %, aged at 150° C. for 14 days | 474.2 | 455.2 | 547.4 | 545.9 |
| Std | 31.1 | 44.1 | 15.6 | 27.7 |
| TS, MPa, aged at 150° C. for 14 days | 19.1 | 19.1 | 21.6 | 21.1 |
| Std | 1.4 | 2.5 | 0.9 | 1.3 |
| TE retention, aged at 150° C. for 14 days | 99.3% | 96.7% | 108.8% | 103.3% |
| TS Retention, aged at 150° C. for 14 days | 97.5% | 90.3% | 113.3% | 103.2% |

*TAIC/HATATA

The invention claimed is:

1. A crosslinkable polymeric composition, comprising:
   (a) a thermoplastic, non-elastomer ethylene-based polymer that is a low-density polyethylene;
   (b) an organic peroxide; and
   (c) a crosslinking coagent comprising N,N,N',N',N",N"-hexaallyl-1,3,5-triazine-2,4,6-triamine.

2. The crosslinkable polymeric composition of claim 1, wherein said ethylene-based polymer is non-polar.

3. The crosslinkable polymeric composition of claim 2, wherein said ethylene-based polymer has no fluoromonomers incorporated therein.

4. The crosslinkable polymeric composition of claim 1, wherein said N,N,N',N',N",N"-hexaallyl-1,3,5-triazine-2,4,6-triamine and said organic peroxide are present in a coagent-to-peroxide weight ratio of greater than 1:1.

5. The crosslinkable polymeric composition of claim 1, wherein said ethylene-based polymer comprises a high-pressure low-density polyethylene; wherein said organic peroxide comprises dicumyl peroxide; wherein said crosslinkable polymeric composition further comprises one or more antioxidants.

6. The crosslinkable polymeric composition of claim 1, wherein said ethylene-based polymer is present in an amount ranging from 50 to 99 weight percent, based on the entire crosslinkable polymeric composition weight; wherein said organic peroxide is present in an amount of less than 1.2 weight percent, based on the entire crosslinkable polymeric composition weight; wherein said crosslinking coagent is present in an amount ranging from 0.01 to 15 weight percent, based on the entire crosslinkable polymeric composition weight.

7. The crosslinkable polymeric composition of claim 1, wherein said N,N,N',N',N",N"-hexaallyl-1,3,5-triazine-2,4,6-triamine constitutes at least 1 weight percent of the total amount of said crosslinking coagent, based on the total weight of said crosslinking coagent.

8. The crosslinkable polymeric composition of claim 1, wherein said crosslinkable polymeric composition exhibits a crosslinking coagent migration to the surface of said crosslinkable polymeric composition of less than 1,000 parts per million when stored for 4 weeks at 23° C. and 1 atm.

9. A crosslinked article prepared from the crosslinkable polymeric composition according to claim 1.

10. A coated conductor, comprising:
    a conductive core; and
    a polymeric layer at least partially surrounding said conductive core, wherein at least a portion of said polymeric layer comprises said crosslinked article of claim 9.

* * * * *